United States Patent
Funato et al.

(10) Patent No.: US 12,247,638 B2
(45) Date of Patent: Mar. 11, 2025

(54) FLUID PRESSURE SHOCK ABSORBER

(71) Applicant: KYB Corporation, Tokyo (JP)

(72) Inventors: Hiroshi Funato, Gifu (JP); Tomoo Kubota, Kanagawa (JP); Masaya Omote, Kanagawa (JP); Yuuta Furukawa, Kanagawa (JP)

(73) Assignee: KYB CORPORATION, Tokyo (JP)

( * ) Notice: Subject to any disclaimer, the term of this patent is extended or adjusted under 35 U.S.C. 154(b) by 364 days.

(21) Appl. No.: 17/414,630

(22) PCT Filed: Dec. 5, 2019

(86) PCT No.: PCT/JP2019/047709
§ 371 (c)(1),
(2) Date: Jun. 16, 2021

(87) PCT Pub. No.: WO2020/129682
PCT Pub. Date: Jun. 25, 2020

(65) Prior Publication Data
US 2022/0065324 A1 Mar. 3, 2022

(30) Foreign Application Priority Data

Dec. 18, 2018 (JP) ................................ 2018-236564

(51) Int. Cl.
*F16F 9/32* (2006.01)
*F16F 9/516* (2006.01)

(52) U.S. Cl.
CPC ............ *F16F 9/516* (2013.01); *F16F 9/3228* (2013.01)

(58) Field of Classification Search
CPC .... F16F 9/063; F16F 9/182; F16F 9/32; F16F 9/3207; F16F 9/3214; F16F 9/322; F16F 9/3221; F16F 9/516; F16F 9/3482; F16F 9/5165
USPC ........ 188/282.1, 282.5, 282.7, 282.8, 322.22
See application file for complete search history.

(56) References Cited

U.S. PATENT DOCUMENTS 3,647,239 A * 3/1972 Katsumori .............. F16F 9/063
188/269
3,804,216 A * 4/1974 Katsumori ............. B60G 15/12
188/269
4,971,344 A * 11/1990 Turner ................... B62K 25/08
188/280

(Continued)

FOREIGN PATENT DOCUMENTS

CN 2811665 Y 8/2006
DE 4226754 A1 * 3/1993 ............. B60G 17/04

(Continued)

*Primary Examiner* — Christopher P Schwartz
(74) *Attorney, Agent, or Firm* — Rabin & Berdo, P.C.

(57) ABSTRACT

A fluid pressure shock absorber includes a piston connected to an end of a piston rod and slidably moving inside a cylinder tube and dividing the cylinder tube into a piston-side chamber and a rod-side chamber, a rod internal space formed inside the piston rod, a first communication passage communicating the rod-side chamber with the rod internal space, a second communication passage formed in the piston and communicating the piston-side chamber with the rod internal space, and a restrictor provided in the second communication passage to apply a resistance to a flow of a working fluid passing through the second communication passage.

9 Claims, 7 Drawing Sheets (56) References Cited

U.S. PATENT DOCUMENTS

| | | | | |
|---|---|---|---|---|
| 5,094,324 | A * | 3/1992 | Tsai | F16F 9/061 |
| | | | | 188/269 |
| 5,195,766 | A * | 3/1993 | Dohrmann | B62K 25/08 |
| | | | | 280/277 |
| 5,328,196 | A * | 7/1994 | Ohma | B62K 25/08 |
| | | | | 188/24.12 |
| 5,775,677 | A * | 7/1998 | Englund | B62K 25/04 |
| | | | | 188/322.19 |
| 9,995,362 | B2 * | 6/2018 | Funato | F16F 9/48 |
| 2006/0266602 | A1 * | 11/2006 | Robertson | F16F 9/063 |
| | | | | 188/322.15 |
| 2010/0187353 | A1 | 7/2010 | Masson et al. | |
| 2013/0161138 | A1 * | 6/2013 | Barefoot | F16F 9/34 |
| | | | | 188/282.1 |
| 2015/0101900 | A1 * | 4/2015 | Kitamura | F16F 9/063 |
| | | | | 188/314 |
| 2016/0138622 | A1 * | 5/2016 | Masuta | F15B 15/22 |
| | | | | 92/9 |
| 2016/0215846 | A1 * | 7/2016 | Noguchi | B60G 13/08 |
| 2016/0215849 | A1 * | 7/2016 | Kurita | F16F 9/50 |
| 2017/0016505 | A1 | 1/2017 | Funato | |

FOREIGN PATENT DOCUMENTS

| | | |
|---|---|---|
| JP | S55-135835 U | 9/1980 |
| JP | 2015-206374 A | 11/2015 |

\* cited by examiner

FLUID PRESSURE SHOCK ABSORBER

TECHNICAL FIELD

The present invention relates to a fluid pressure shock absorber.

BACKGROUND ART

In the fluid pressure shock absorber described in JP2015-206374A, a piston rod has a rod portion extending outward from a cylinder, and a piston connected to the end of the rod portion and slidably moving inside the cylinder and dividing the cylinder into a piston-side chamber and a rod-side chamber. The rod portion has a rod internal space formed inside the rod portion and communicated with the piston-side chamber of the cylinder, a first communication passage communicating the rod internal space with the rod-side chamber of the cylinder, and an orifice plug replaceably provided in the first communication passage.

SUMMARY OF INVENTION

In the fluid pressure shock absorber described in JP2015-206374A, the first communication passage with the orifice plug is provided in the rod portion. In a case where the rod portion is a large component, it takes a lot of time and effort to form the first communication passage in the rod portion, and there is a problem that the fluid pressure shock absorber cannot be manufactured easily.

The present invention has an object to manufacture the fluid pressure shock absorber easily.

According to an aspect of the present invention, a fluid pressure shock absorber includes: a cylinder tube; a piston rod extending outward from the cylinder tube; a piston connected to an end of the piston rod and slidably moving inside the cylinder tube and dividing the cylinder tube into a piston-side chamber and a rod-side chamber; a rod internal space formed inside the piston rod; a first communication passage communicating the rod-side chamber with the rod internal space; a second communication passage formed in the piston and communicating the piston-side chamber with the rod internal space; and a restrictor provided in the second communication passage to apply a resistance to a flow of a working fluid passing through the second communication passage.

DESCRIPTION OF EMBODIMENTS

Hereinafter, embodiments of the present invention will be described with reference to the drawings.

First Embodiment

Figure 1:
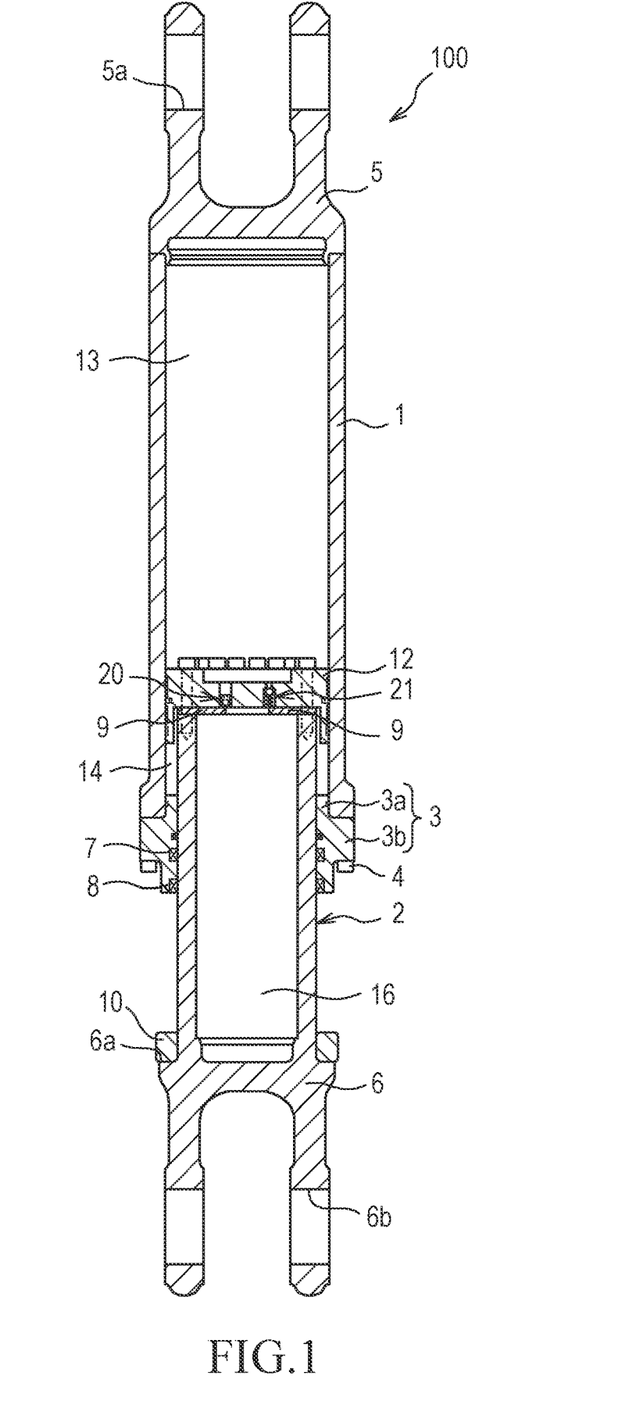
FIG. 1 is a cross-sectional view of a shock absorber according to a first embodiment of the present invention.

First, referring to FIGS. 1 to 3, a fluid pressure shock absorber according to the first embodiment of the present invention will be described. In the first embodiment, a description in a case where the fluid pressure shock absorber is a shock absorber 100 mounted on a vehicle will be given.

For example, the shock absorber 100 is a device that is attached between a body and an axle shaft of the vehicle and generates a damping force to reduce a vibration of the body.

The shock absorber 100 includes a cylindrical cylinder tube 1, a piston rod 2 freely inserted into the cylinder tube 1 and extending outward from the cylinder tube 1, and a piston 12 connected to the end of the piston rod 2 and moving slidably along an inner peripheral surface of the cylinder tube 1. In this embodiment, the shock absorber 100 is mounted on the vehicle so that the cylinder tube 1 is on the upper side and the piston rod 2 is on the lower side.

The inside of the cylinder tube 1 is divided into a piston-side chamber 13 and a rod-side chamber 14 by the piston 12, and the piston-side chamber 13 and the rod-side chamber 14 are filled with a working oil serving as a working fluid. Further, the inside of the cylinder tube 1 is filled with gas to obtain a spring action using the volume change in the cylinder tube 1 caused by the piston rod 2 moving into and out of the cylinder tube 1. In this way, the shock absorber 100 may be the fluid pressure shock absorber with a function of an air suspension that can support the vehicle body by the spring action of the gas. In this case, it is possible to generate the damping force and support the vehicle body by the shock absorber 100 without a separate spring to support the body. In addition, the cylinder tube 1 does not need to be filled with the gas.

A cylinder head 3 through which the piston rod 2 is slidably inserted is provided at the end of the cylinder tube 1. The cylinder head 3 has a cylindrical main body 3a and a flange portion 3b with a larger diameter than the main body 3a. The cylinder head 3 is fixed to the cylinder tube 1 by fastening the flange portion 3b to the end of the cylinder tube 1 with a bolt 4. An inner peripheral surface of the main body 3a of the cylinder head 3 is provided with a seal member 7 and a dust seal 8 that are in sliding contact with an outer peripheral surface of the piston rod 2.

A bottom member 5 is joined to the end of the cylinder tube 1 on the opposite side of the cylinder head 3. The bottom member 5 has an attaching portion 5a for attaching the shock absorber 100 to the vehicle.

The piston rod 2 is a cylindrical member and has a rod internal chamber 16 serving as a rod internal space. The piston rod 2 opens at both ends. A rod head 6 is provided at an opening end on the side extending from the cylinder tube 1, and the piston 12 is provided at the other opening end. In this way, the rod internal chamber 16 is partitioned by the rod head 6 and the piston 12.

The rod head 6 has a stopper portion 6a and an attaching portion 6b. The stopper portion 6a is formed with a larger diameter than the piston rod 2 and defines the stroke end of the shock absorber 100 during contracting. The attaching portion 6b is used to attach the shock absorber 100 to the vehicle. A annular cushion ring 10 is provided on the stopper portion 6a. The annular cushion ring 10 prevents collision between the cylinder head 3 and the rod head 6 at the stroke end when the shock absorber 100 is contracted.

Figure 2:
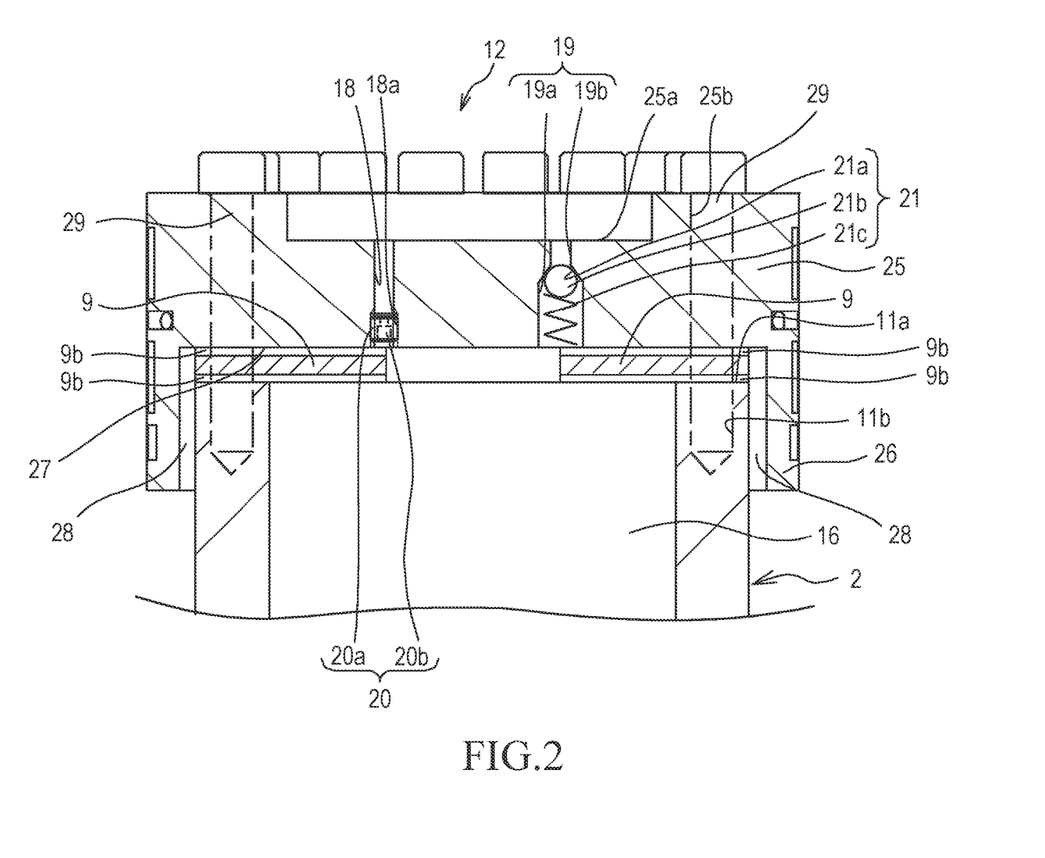
FIG. 2 is a partially enlarged view of a connecting portion of a piston and a piston rod in FIG. 1.
Figure 3:
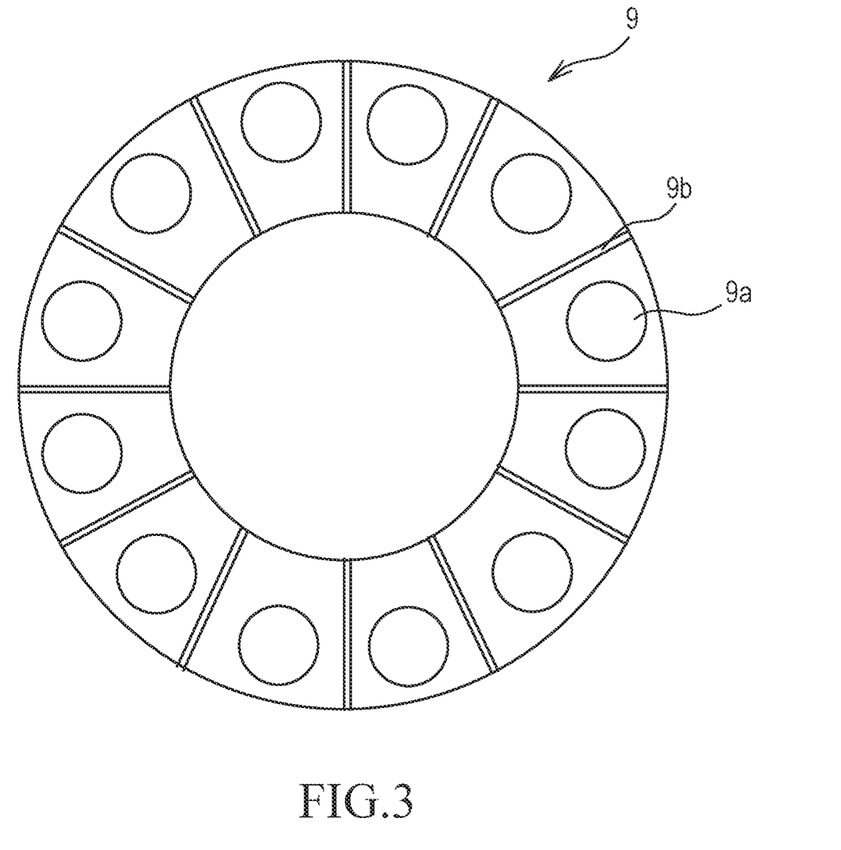
FIG. 3 is a plane view of a plate of the first embodiment of the present invention.

As shown in FIGS. 2 and 3, the piston 12 is connected to the piston rod 2 via the plate 9. The plate 9 is provided between the piston rod 2 and the piston 12. A communication groove 9b serving as a first communication passage that constantly communicates the rod internal chamber 16 with the rod-side chamber 14 is formed on the plate 9.

The shock absorber 100 has a second communication passage 18 and a third communication passage 19 that are formed in the piston 12 and communicate the rod internal chamber 16 with the piston-side chamber 13. An orifice plug 20 serving as a restrictor is replaceably provided in the second communication passage 18. The orifice plug 20 generates the damping force by applying a resistance to the working oil passing through the orifice plug 20. A check valve 21 is provided in the third communication passage 19. The check valve 21 allows only the flow of the working oil from the piston-side chamber 13 to the rod internal chamber 16.

When the shock absorber 100 is contracted, the pressure in the piston-side chamber 13 rises and the check valve 21 opens. Thereby, the working oil in the piston-side chamber 13 flows into the rod internal chamber 16 and the rod-side chamber 14 through the check valve 21 and the orifice plug 20. On the other hand, when the shock absorber 100 is extended, the pressure in the rod-side chamber 14 and the rod internal chamber 16 rises and the check valve 21 closes. Thereby, the working oil in the rod-side chamber 14 and the rod internal chamber 16 flows into the piston-side chamber 13 through the orifice plug 20 only. In this way, the damping force generated by the shock absorber 100 during extending is larger than the damping force during contracting. Therefore, when the vehicle rides on a protrusion on a road surface, the shock absorber 100 contracts relatively smoothly and then generates a large damping force during extending. As a result, the vibration input to the vehicle body from the road surface is effectively damped.

Hereinafter, a connection structure of the piston rod 2 and the piston 12 will be explained in detail.

As shown in FIG. 2, the piston 12 has a cylindrical main body 25 and a cylindrical ring portion 26. The cylindrical main body 25 is fastened to the piston rod 2 and has a recessed portion 25a. The cylindrical ring portion 26 is formed continuously with the outer peripheral surface of the main body 25 and protrudes to an axial direction from the end surface of the main body 25. In this way, the piston 12 has the recessed portion 25a on one end surface and the ring portion 26 protrudes from the other end surface of the piston 12. In the piston 12, a concave storage portion 27 is formed by the main body 25 and the ring portion 26. The tip of the piston rod 2 is inserted into the storage portion 27, and the piston rod 2 and the piston 12 are connected. The ring portion 26 functions as a locating part to position between the piston rod 2 inserted in the storage portion 27 and the piston 12 in a radial direction (to ensure coaxiality between the piston rod 2 and the piston 12), and the ring portion 26 also functions as a pressure receiving part to receive the radial load acting on the piston rod 2.

An inner peripheral surface of the ring portion 26 has a plurality of grooves 28 along the axial direction, the grooves 28 are aligned in a circumferential direction. The grooves 28 are formed along the axial direction so that its reach from the end of the ring portion 26 to the main body 25. In a state where the piston rod 2 and the piston 12 are connected, a space between the outer peripheral surface of the piston rod 2 and the inner circumference of the ring portion 26 is formed by the grooves 28. It should be noted that it is sufficient that at least one groove 28 is formed.

A fastener hole 25b is formed in the main body 25. The fastener hole 25b penetrates the main body 25 in the axial direction and opens to the storage portion 27. A plurality of fastener holes 25b is formed in the circumferential direction with predetermined interval. A fastener bore 11b is also formed in the piston rod 2. The fastener bore 11b is formed along the axial direction from an opening on an end surface 11a. The fastener bore 11b is a threaded hole into which a bolt 29 for fastening is screwed. A plurality of fastener bores 11b is formed in the circumferential direction with the same interval as the fastener holes 25b. The fastener holes 25b are formed at a position facing the end surface 11a of the piston rod 2 when a tip side of the piston rod 2 is inserted into the storage portion 27. The piston rod 2 and the piston 12 are connected by fastening the bolts 29 over the fastener holes 25b and the fastener bores 11b in a state where the tip side of the piston rod 2 inserted into the storage portion 27.

As shown in FIG. 3, the plate 9 is a flat circular member. The plate 9 has a plurality of fastener holes 9a and a plurality of communication grooves 9b. The fastener holes 9a penetrate the plate 9 in the axial direction. The communication grooves 9b is formed on both end surfaces of the plate 9. The communication grooves 9b may be formed only on one surface of the plate 9. An outer diameter of the plate 9 is the same as an outer diameter of the piston rod 2. An inner diameter of the plate 9 is set so as to cover a part of an opening of the second communication passage 18 and a part of an opening of the third communication passage 19 of the piston 12 in a state where the piston rod 2 and the piston 12 are connected each other.

The fastener holes 9a are formed in the circumferential direction with the same interval as the fastener holes 25b and the fastener bores 11b. The bolt 29 that connects the piston 12 with the piston rod 2 is inserted in the fastener hole 9a.

The communication groove 9b is formed in the radial direction of the plate 9 so as to communicate an outer peripheral surface with an inner peripheral surface of the plate 9. The communication groove 9b is formed between adjacent the fastener holes 9a.

When the piston 12 is connected to the piston rod 2, firstly, the plate 9 is housed in the storage portion 27 of the piston 12. Next, the tip side of the piston rod 2 is inserted into the storage portion 27, and the end surface 11a of the piston rod 2 is brought into contact with the plate 9. Then, in a state where the fastener holes 25b, the fastener holes 9a, and the fastener bores 11b are aligned, each of the bolts 29 is inserted from the fastener hole 25b through the fastener hole 9a and fastened to the fastener bore 11b. In this way, the piston 12 is fixed to the piston rod 2.

In a state where the piston 12 and the piston rod 2 are connected, the rod internal chamber 16 and the rod-side chamber 14 are constantly communicated with each other through the grooves 28 and the communication grooves 9b formed on the plate 9. The grooves 28 and the communication grooves 9b allow the flow of the working oil. In this way, the communication grooves 9b constitute the first communication passage which constantly communicates the rod internal chamber 16 with the rod-side chamber 14.

Thus, in this embodiment, the rod-side chamber 14 and the rod internal chamber 16 are constantly communicated with each other through the communication grooves 9b. Therefore, when the shock absorber 100 is contracted at high speed or when the shock absorber 100 is contracted from the maximum extension state, the working oil in the rod internal chamber 16 is promptly led to the rod-side chamber 14. As a result, a sudden drop of the pressure in the rod-side chamber 14 is suppressed.

Hereinafter, the details of the second communication passage 18 and the third communication passage 19 will be described.

The second communication passage 18 and the third communication passage 19 are formed by passing through the main body 25 in the axial direction and opens to the recessed portion 25a of the piston 12. An internal thread 18a is formed only at the plate 9 side on an inner peripheral surface of the second communication passage 18. The orifice plug 20 has an external thread 20a and an orifice portion 20b. The external thread 20a is formed on the outer peripheral surface of the orifice plug 20 and screwed to the internal thread 18a of the second communication passage 18. The orifice portion 20b restricts the flow of the working oil. The orifice plug 20 is screwed into the second communication passage 18 and fastened. Further, the communication grooves 9b of the plate 9 are formed such that the total flow path cross-sectional area of the communication grooves 9b in a state where the piston 12 and piston rod 2 are connected is sufficiently larger than the flow path cross-sectional area of the orifice portion 20b of the orifice plug 20. Furthermore, the grooves 28 provided in the piston 12 are formed such that the total flow path cross-sectional area of the grooves 28 in a state where the piston 12 and piston rod 2 are connected is sufficiently larger than the flow path cross-sectional area of the orifice portion 20b of the orifice plug 20. This means that a resistance applied to the flow of the working oil through the communication grooves 9b and the grooves 28 is smaller than a resistance applied to the flow of the working oil through the orifice plug 20. Therefore, most of the damping force generated by the shock absorber 100 during extending is determined by the orifice portion 20b.

The third communication passage 19 has a large-diameter portion 19a and a small-diameter portion 19b. The large-diameter portion 19a opens to the rod internal chamber 16. The small-diameter portion 19b has a diameter smaller than the large-diameter portion 19a and opens to the piston-side chamber 13. The check valve 21 has an annular seat surface 21a, a ball 21b serving as a valve body, and a spring 21c serving as a biasing member. The seat surface 21a is formed between the large-diameter portion 19a and the small-diameter portion 19b. The ball 21b has a diameter larger than the inner diameter of the small diameter portion 19b and housed in the large-diameter portion 19a. The spring 21c biases the ball 21b toward the seat surface 21a. When the pressure on the large-diameter portion 19a side is larger than the pressure on the small-diameter portion 19b side, the ball 21b is biased by the spring 21c and is seated on the seat surface 21a. Thereby, the flow of the working oil from the rod internal chamber 16 to the piston-side chamber 13 is blocked. On the other hand, when the pressure on the small-diameter portion 19b side is larger than the pressure on the large-diameter portion 19a side, the ball 21b is separated from the seat surface 21a against the biasing force of the spring 21c. Thereby, the flow of the working oil from the piston-side chamber 13 to the rod internal chamber 16 is allowed.

In this way, since the second communication passage 18 is provided in the piston 12 which is a smaller component than the piston rod 2, it is easier to form the second communication passage 18. Therefore, it is easier to manufacture the shock absorber 100. Moreover, since the thickness of the piston 12 is larger than that of the piston rod 2, there is more flexibility in placement of the second communication passage 18. Therefore, not only the orifice plug 20 but also other components can be provided in the third communication passage 19.

Furthermore, since the third communication passage 19 is provided in the piston 12 which is a smaller component than the piston rod 2, it is easier to form the third communication passage 19. Therefore, it is easier to manufacture the shock absorber 100. Moreover, since the thickness of the piston 12 is larger than that of the piston rod 2, there is more flexibility in placement of the third communication passage 19. Therefore, a component such as the spring 21c or the like can be provided in the third communication passage 19. In other words, the check valve 21 can be a spring check valve having the spring 21c. Therefore, it is possible that the check valve 21 is operated more stably.

Generally, the longer the passage length is, the more the working oil flowing through the passage becomes a so-called choked flow. Therefore, the flow rate through the passage is more easily affected by the viscosity of the working oil. Since the viscosity of the working oil changes with variation of temperature, the flow rate is likely to change with variation of temperature in a state of the choked flow. In contrast, in this embodiment, the second communication passage 18 and the third communication passage 19 are formed to open to the recessed portion 25a of the piston 12. Thereby, the passage length is relatively short. Therefore, the flow of the working oil through the third communication passage 19 is likely to become a so-called an orifice flow. Therefore, the flow rate of the working oil flowing in the third communication passage 19 through the check valve 21 is less affected by variation of temperature. Thus, the flow of the working oil through the third communication passage 19 is less temperature dependent. As a result, the shock absorber 100 can be operated in a stable manner.

The plate 9 is disposed so as to close a part of the opening of the second communication passage 18 that opens to the rod internal chamber 16 while allowing the working oil to flow into the second communication passage 18. In other words, the plate 9 is disposed between the piston 12 and the piston rod 2 so as to cover a part of the orifice plug 20. Specifically, the inner edge of the plate 9 prevents the orifice plug 20 from falling out of the second communication passage 18 into the rod internal chamber 16. Moreover, since the internal thread is not formed on the piston-side chamber 13 side of the inner peripheral surface of the second communication passage 18. Thereby, the orifice plug 20 does not fall into the piston-side chamber 13. Therefore, the plate 9 can prevent the orifice plug 20 from falling out.

The plate 9 is disposed so as to close a part of the opening of the third communication passage 19 that opens to the rod internal chamber 16 while allowing the working oil to flow into the third communication passage 19. In other words, the plate 9 is disposed between the piston 12 and the piston rod 2 so as to cover a part of the check valve 21. Specifically, the inner edge of the plate 9 prevents the ball 21b and the spring 21c of the check valve 21 from falling out of the third communication passage 19 into the rod internal chamber 16. Therefore, the plate 9 can also prevent the check valve 21 from falling out.

In this way, since the plate 9 having the communication grooves 9b is provided, the rod internal chamber 16 and the rod-side chamber 14 can be communicated with each other through the communication grooves 9b and the orifice plug 20 and the check valve 21 can be prevented from falling into the rod internal chamber 16. In other words, the plate 9 is formed in a shape that communicates the rod internal chamber 16 with the rod-side chamber 14, and does not reduce the flow paths of the orifice portion 20b, the third communication passage 19, and the check valve 21 while preventing the orifice plug 20 and check valve 21 from falling into the rod internal chamber 16.

According to the first embodiment described above, the following effects are achieved.

The shock absorber 100 has the second communication passage 18 that is formed in the piston 12 and is provided with the orifice plug 20. Since the second communication passage 18 is formed in the piston 12 which is a smaller component than the piston rod 2, the second communication passage 18 can be easily formed. And it is easier to manufacture the shock absorber 100.

Further, the shock absorber 100 has the third communication passage 19 that is formed in the piston 12 and is provided with the check valve 21. Since the third communication passage 19 is formed in the piston 12 which is a smaller component than the piston rod 2, the third communication passage 19 can be easily formed. And it is easier to manufacture the shock absorber 100.

Further, since the thickness of the piston 12 is larger than that of the piston rod 2, there is more flexibility in placement of the second communication passage 18. Therefore, not only the orifice plug 20 but also other components can be provided in the third communication passage 19. Moreover, since the thickness of the piston 12 is larger than that of the piston rod 2, there is more flexibility in placement of the third communication passage 19. Therefore, other components, such as the ball 21b and the spring 21c or the like constituting the check valve 21, can be provided in the third communication passage 19.

Furthermore, the shock absorber 100 has the plate 9 disposed between the piston rod 2 and the piston 12. The rod-side chamber 14 and the rod internal chamber 16 are constantly communicated with each other through the communication grooves 9b. Therefore, when the shock absorber 100 is contracted at high speed or when the shock absorber 100 is contracted from the maximum extension state, the working oil in the rod internal chamber 16 is promptly led to the rod-side chamber 14. As a result, a sudden drop of the pressure in the rod-side chamber 14 is suppressed.

Next, variations of the present embodiment will be described. The following variations are also within the scope of the present invention. It is possible to combine the following variations with each configuration of the above embodiment, combine the following variations with each configuration of the second embodiment described below, or combine the following variations with each other.

Figure 4:
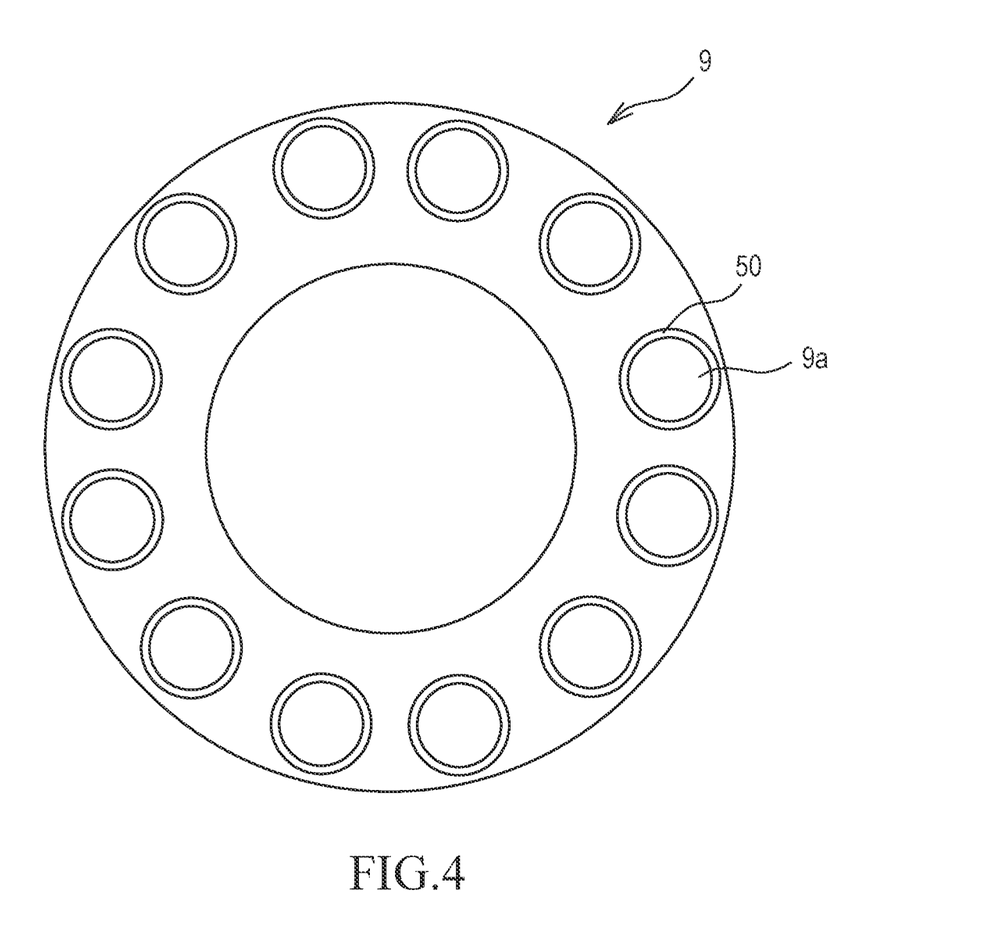
FIG. 4 is a plane view of a plate and a washer according to a variation of the first embodiment of the present invention.

(1) In the above embodiment, the plate 9 having the communication grooves 9b is provided between the piston rod 2 and the piston 12. Instead of forming the communication grooves 9b on the plate 9, a plurality of washers 50 may be provided on the plate 9 as shown in FIG. 4. The washer 50 is an annular member and is disposed to correspond to the fastener holes 9a. The bolt 29 is inserted into the washer 50 and the fastener hole 9a. In a state where the piston 12 and the piston rod 2 are connected, a gap is formed between each the washer 50. The rod internal chamber 16 and the rod-side chamber 14 are communicated with each other through this gap. This gap allows the flow of the working oil. In other words, in this variation, the gap formed between each the washer 50 corresponds to the first communication passage. Only the washers 50 may be provided between the piston 12 and the piston rod 2 without the plate 9. In this case, it is desirable to provide another component to prevent the orifice plug 20 and the spring 21c from falling into the rod internal chamber 16.

Figure 5:
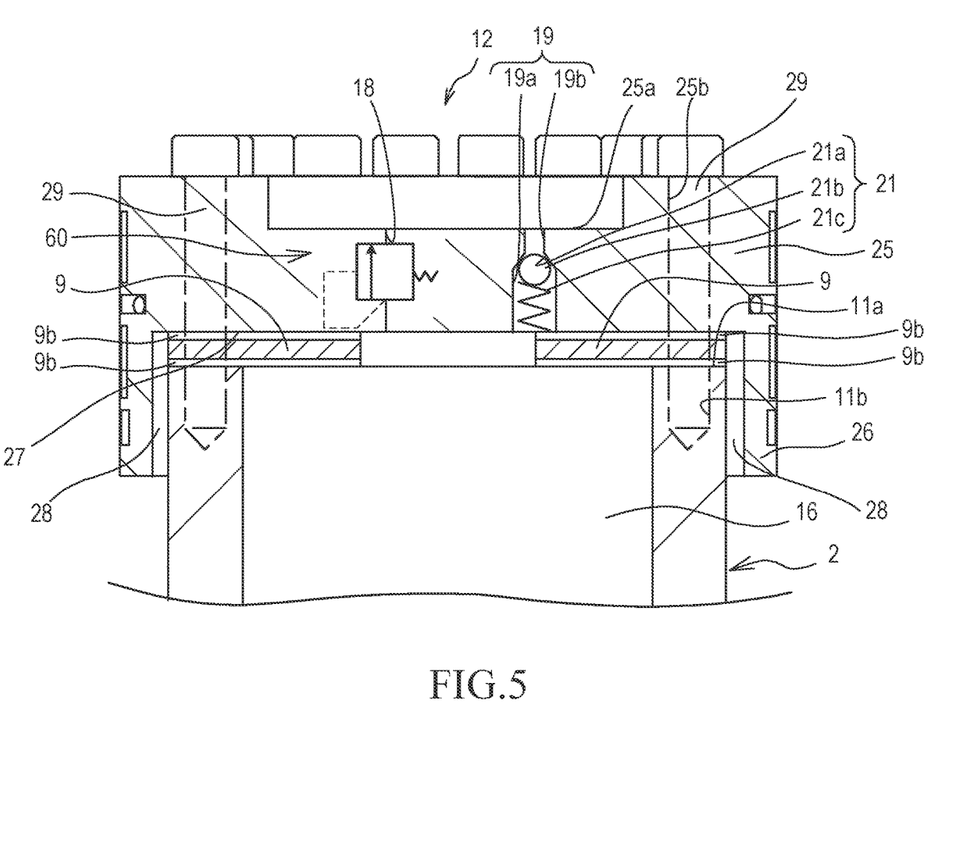
FIG. 5 shows a partially enlarged view of a connecting portion of the piston and the piston rod according to the variation of the first embodiment of the present invention.

(2) In the above embodiment, the orifice plug 20 is provided as the restrictor that generates the damping force by applying the resistance to the working oil passing through the second communication passage 18. Instead of the orifice plug 20, as shown in FIG. 5, a relief valve 60 may be provided as the restrictor. The relief valve 60 opens when the pressure in the rod internal chamber 16 reaches a predetermined pressure. In this case, when the pressure in the rod internal chamber 16 rises and reaches the predetermined pressure, the relief valve 60 opens, and then the working oil is led to the piston-side chamber 13. Thereby, the damping force is generated by a resistance of the relief valve 60. Furthermore, both the orifice plug 20 and the relief valve 60 may be provided on the piston 12.

(3) In the above embodiment, the check valve 21 is configured to have the ball 21b serving as the valve body that opens and closes the third communication passage 19 and the spring 21c serving as the biasing member. Instead of this configuration, the check valve 21 may be configured without the spring 21c. Even in this case, the check valve 21 blocks the flow of the working oil from the rod internal chamber 16 to the piston-side chamber 13, and allows the flow of the working oil from the piston-side chamber 13 to the rod internal chamber 16.

(4) In the above embodiment, the shock absorber 100 is mounted on the vehicle so that the cylinder tube 1 is on the upper side and the piston rod 2 is on the lower side. Instead of this configuration, the shock absorber 100 may be mounted upside down on vehicle so that the piston rod 2 is on the upper side and the cylinder tube 1 is on the lower side.

In the above embodiment, the piston 12 has the ring portion 26 which forms the storage portion 27. And the communication grooves 9b formed on the plate 9 are communicated with the rod-side chamber 14 through the grooves 28 formed in the ring portion 26. Instead of this configuration, the ring portion 26 is not an essential configuration. The piston 12 may not be provided with the ring portion 26. In this case, the communication grooves 9b are configured to be in direct communication with the rod-side chamber 14.

Second Embodiment

Next, with reference to FIG. 6 and FIG. 7, a shock absorber 200 according to the second embodiment of the present invention will be described. The following explanation focuses on the points that differ from the above first embodiment, and the same sign is attached to the configuration that has the same function as the above first embodiment of the shock absorber 100 to omit the explanation.

In the shock absorber 100 according to the first embodiment, the first communication passage that communicates the rod internal chamber 16 and the rod-side chamber 14 is the communication grooves 9b formed on the plate 9. In contrast, the shock absorber 200 according to the second embodiment differs from the first embodiment in that the first communication passage is a passage 110 formed in the piston rod 2.

Figure 6:
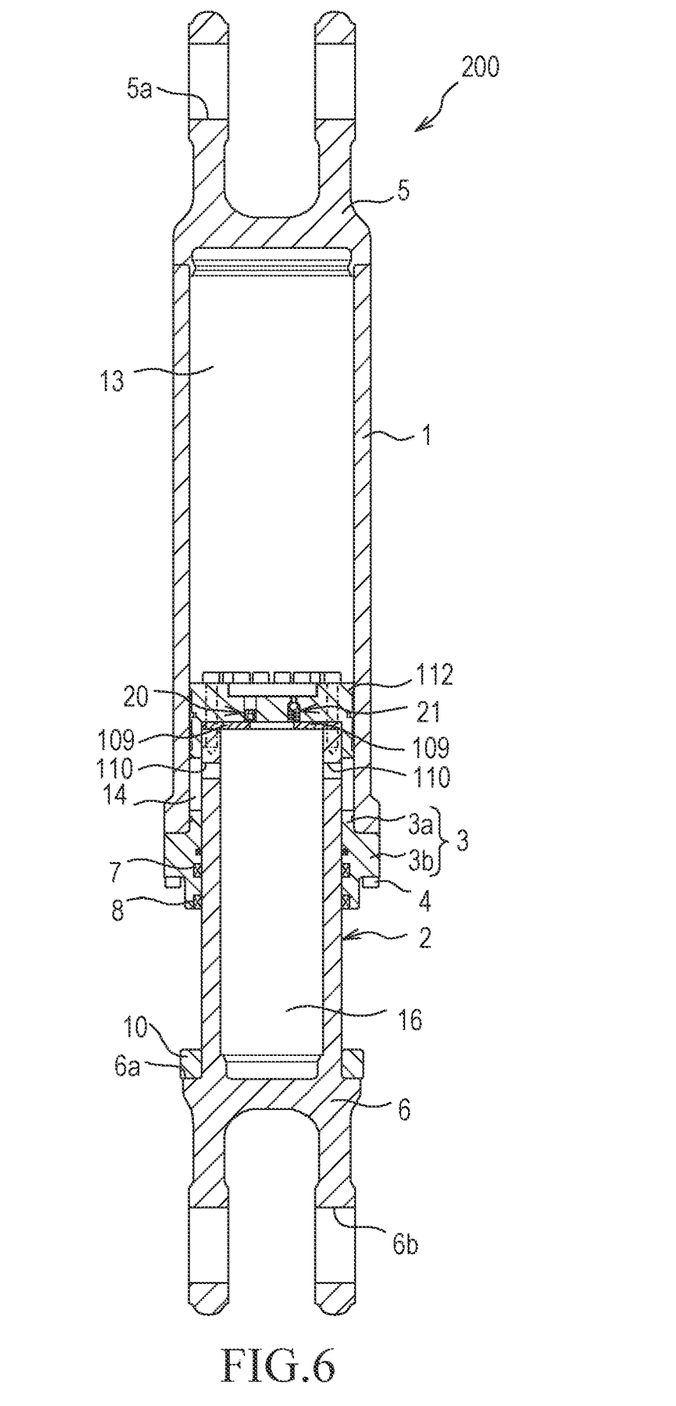
FIG. 6 is a cross-sectional view of a shock absorber according to a second embodiment of the present invention.
Figure 7:
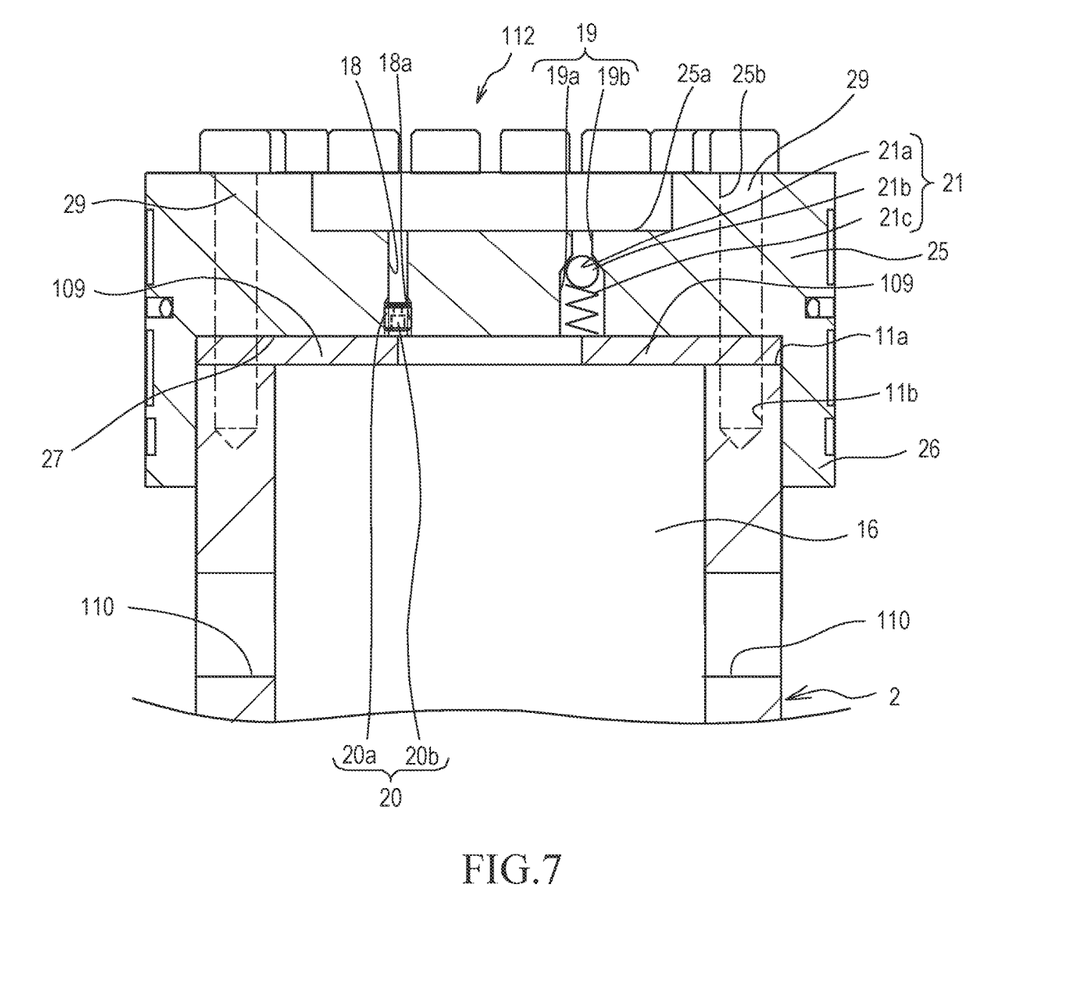
FIG. 7 shows a partially enlarged view of a connecting portion of the piston and the piston rod in FIG. 6.

As shown in FIG. 6 and FIG. 7, the shock absorber 200 includes the passage 110 that has openings on the inner peripheral surface and the outer peripheral surface of the piston rod 2, and penetrates the piston rod 2 in the radial direction. The piston rod 2 according to the second embodiment differs from the piston rod 2 according to the second embodiment only in that the passage 110 is formed. In this embodiment, the two passages 110 are formed with a 180° offset. The number of the passage 110 is not limited to two, but at least one passage 110 is required to be formed. The inner diameter of the passages 110 is uniformly formed. The total flow path cross-sectional area of the passages 110 is formed such that it is sufficiently larger than the flow path cross-sectional area of the orifice portion 20*b* of the second communication passage 18. Thus, a resistance applied to the flow of the working oil passing through the passage 110 is smaller than a resistance applied to the flow of the working oil passing through the orifice plug 20. Therefore, most of the damping force generated by the shock absorber 200 during extending is determined by the orifice portion 20*b*.

Also, in the shock absorber 200, a plate 109 is provided between the piston rod 2 and a piston 112. The plate 109 differs from the plate 9 according to the first embodiment only in that the communication grooves 9*b* is not formed. Furthermore, the piston 112 differs from the piston 12 according to the first embodiment only in that the grooves 28 are not formed on the inner peripheral surface of the ring portion 26. Therefore, the inner diameter of the ring portion 26 of the piston 112 is substantially the same as the outer diameter of the piston rod 2.

The outer diameter of the plate 109 is the same as the outer diameter of the piston rod 2. And the method of connecting the piston rod 2 with the piston 112 is the same as the first embodiment. The plate 109 prevents the orifice plug 20 and the check valve 21 from falling into the rod internal chamber 16.

It should be noted that the passages 110 may be a slit formed on the end surface 11*a* of the piston rod 2.

According to the second embodiment described above, the following effects are achieved.

In the shock absorber 200, the rod-side chamber 14 and the rod internal chamber 16 are constantly communicated with each other through the passages 110. Therefore, when the shock absorber 200 is contracted at high speed or when the shock absorber 200 is contracted from the maximum extension state, the working oil in the rod internal chamber 16 is promptly led to the rod-side chamber 14. As a result, a sudden drop of the pressure in the rod-side chamber 14 is suppressed.

Further in the shock absorber 200, the passage 110 serving as the first communication passage is formed in the piston rod 2. Thus, it is only necessary to form the passage 110 on the piston rod 2 which has a flow path cross-sectional area larger than a flow path cross-sectional area of the orifice portion 20*b*. There is no need to form a plurality of grooves on the plate 109. Therefore, it is easier to manufacture the shock absorber 200.

The following is a summary description of the structure, action, and effect of the embodiment of the present invention.

The shock absorber 100, 200 includes the piston rod 2, the piston 12, 112, the rod internal chamber 16 (rod internal space), the communication groove 9*b*, the passage 110 (first communication passage), the second communication passage 18, and the orifice plug 20 (restrictor). The piston rod 2 extends outward from the cylinder tube 1. The piston 12, 112 is connected to the end of the piston rod 2 and slidably moving inside the cylinder tube 1 and dividing the cylinder tube 1 into the piston-side chamber 13 and the rod-side chamber 14. The rod internal chamber 16 is formed inside the piston rod 2. The communication groove 9*b* and the passage 110 communicate the rod internal chamber 16 with the rod-side chamber 14. The second communication passage 18 is formed in the piston 12, 112 and communicates the piston-side chamber 13 with the rod internal chamber 16. The orifice plug 20 is provided in the second communication passage 18 to apply the resistance to the flow of the working oil passing through the second communication passage 18.

In this configuration, the second communication passage 18 provided with the restrictor is formed in the piston 12 which is a smaller component than the piston rod 2. Therefore, it is easier to form the second communication passage 18. And it is easier to manufacture the shock absorber 100, 200. Furthermore, since the thickness of the piston 12, 112 is larger than that of the piston rod 2, there is more flexibility in placement of the second communication passage 18. Therefore, not only the orifice plug 20 but also other components can be provided in the third communication passage 19.

Further, the shock absorber 100, 200 further includes the third communication passage 19 and the check valve 21. The third communication passage 19 is formed in the piston 12, 112 and communicates the piston-side chamber 13 with the rod internal chamber 16. The check valve 21 is provided in the third communication passage 19 and allows only the flow of the working oil from the piston-side chamber 13 to the rod internal chamber 16.

In this configuration, the third communication passage 19 having the check valve 21 is formed in the piston 12, 112, which is a smaller component than the piston rod 2. Therefore, it is easier to form the third communication passage 19. And it is easier to manufacture the fluid pressure shock absorber. Furthermore, since the thickness of the piston 12, 112 is larger than that of the piston rod 2, there is more flexibility in placement of the third communication passage 19. Therefore, other components, such as the spring 21*c* or the like can be provided in the third communication passage 19.

Further, the shock absorber 100 further includes the plate 9 provided between the piston 12 and the piston rod 2. And the communication groove 9*b* is formed on the plate 9.

In this configuration, the communication groove 9*b* is formed on the plate 9 which is a smaller component than the piston rod 2 and the piston 12. Therefore, it is easier to form the communication groove 9*b*. Furthermore, the rod-side chamber 14 and the rod internal chamber 16 are constantly communicated with each other through the communication groove 9*b* formed on the plate 9. Therefore, when the shock absorber 100 is contracted at high speed or when the shock absorber 100 is contracted from the maximum extension state, the working oil in the rod internal chamber 16 is promptly led to the rod-side chamber 14. As a result, a sudden drop of the pressure in the rod-side chamber 14 is suppressed.

Further, the restrictor is the orifice plug 20 replaceably provided in the second communication passage 18. The plate 9, 109 prevents the orifice plug 20 from falling into the rod internal chamber 16.

In this configuration, the orifice plug 20 is replaceably provided in the second communication passage 18. Thus, it is easy to adjust the damping force by replacing the orifice plug 20. Furthermore, the plate 9, 109 prevents the orifice plug 20 from falling out.

Further, the check valve 21 is prevented from falling into the rod internal chamber 16 by the plate 9, 109.

In this configuration, the plate 9, 109 prevents the check valve 21 from falling out.

Further, the passage 110 is formed on the piston rod 2.

In this configuration, it is only necessary to form the passage 110 with a large flow path cross-sectional area on the piston rod 2, and there is no need to form a plurality of grooves on the plate 109. Therefore, it is easier to manufacture the shock absorber 200.

Further, the resistance applied to the flow of the working oil passing through the communication groove 9b and the passage 110 is smaller than the resistance applied to the flow of the working oil passing through the second communication passage 18.

In this configuration, the restrictor provided in the second communication passage 18 generates the damping force during extension. In other words, since the influence of the communication groove 9b and the passage 110 on the damping force is reduced, the desirable damping force can be generated by the restrictor provided in the second communication passage 18. This makes it easier to adjust the damping force.

Although the embodiments of the present invention have been described in the above, the above-mentioned embodiments merely illustrate a part of application examples of the present invention, and the technical scope of the present invention is not intended to be limited to the specific configurations of the above-described embodiments.

This application claims priority based on Japanese Patent Application No. 2018-236564 filed with the Japan Patent Office on Dec. 18, 2018, the entire contents of which are incorporated into this specification by reference.

The invention claimed is:

1. A fluid pressure shock absorber, comprising:
a cylinder tube;
a piston rod extending outward from inside of the cylinder tube and having a first end and a second end opposite to each other in an axial direction of the piston rod, the piston rod having a rod internal space therein, the piston rod having a rod head provided at the first end of the piston rod;
a piston provided at the second end of the piston rod, the rod internal space being bounded at opposite ends thereof respectively by the rod head and the piston, the piston slidably moving inside the cylinder tube with the piston rod and dividing a space inside the cylinder tube into a piston-side chamber and a rod-side chamber;
a first communication passage communicating the rod-side chamber with the rod internal space;
a second communication passage formed in the piston and communicating the piston-side chamber with the rod internal space;
a restrictor provided in the second communication passage to apply a resistance to a flow of a working fluid passing through the second communication passage;
a third communication passage formed in the piston and communicating the piston-side chamber with the rod internal space; and
a check valve provided in the third communication passage to allow only a flow of the working fluid from the piston-side chamber to the rod internal space, wherein
the rod internal space, bounded at the opposite ends respectively by the rod head and the piston, consists of a single continuous space within the piston rod,
a resistance applied to a flow of the working fluid passing through the first communication passage is smaller than the resistance applied by the restrictor to the flow of the working fluid passing through the second communication passage, and
the shock absorber is configured to generate a damping force by extending or contracting, and while the shock absorber is extended and a pressure in the rod-side chamber and the rod internal space rises above a pressure in the piston-side chamber, the check valve is closed and the working fluid in the rod-side chamber and the rod internal space flows into the piston-side chamber only through the second communication passage.

2. The fluid pressure shock absorber according to claim 1, wherein
the first communication passage is formed in the piston rod.

3. The fluid pressure shock absorber according to claim 1, wherein
the damping force is generated by a difference in pressure between the rod internal space and the rod-side chamber, and
a flow rate of the working fluid, which flows directly from the rod internal space to the rod-side chamber using the second communication passage during the extending, is configured to be greater than a flow rate of the working fluid, which flows directly to the rod internal space from the rod-side chamber using the second communication passage during the contracting, whereby the damping force generated during the extending is greater than the damping force generated during the contracting.

4. A fluid pressure shock absorber, comprising:
a cylinder tube;
a piston rod extending outward from the cylinder tube and having a rod internal space inside thereof;
a piston connected to an end of the piston rod and slidably moving inside the cylinder tube and dividing the cylinder tube into a piston-side chamber and a rod-side chamber;
a first communication passage communicating the rod-side chamber with the rod internal space;
a second communication passage formed in the piston and communicating the piston-side chamber with the rod internal space;
a restrictor provided in the second communication passage to apply a resistance to a flow of a working fluid passing through the second communication passage;
a third communication passage formed in the piston and communicating the piston-side chamber with the rod internal space;
a check valve provided in the third communication passage to allow only a flow of the working fluid from the piston-side chamber to the rod internal space; and
a plate provided between the piston and the piston rod, wherein
the first communication passage is formed in the plate.

5. The fluid pressure shock absorber according to claim 4, wherein
the restrictor is an orifice plug replaceably provided in the second communication passage, and
the plate prevents the orifice plug from falling into the rod internal space.

6. The fluid pressure shock absorber according to claim 4, wherein
the check valve is prevented from falling into the rod internal space by the plate.

7. A fluid pressure shock absorber, comprising:
a cylinder tube;
a piston rod extending outward from inside of the cylinder tube and having a first end and a second end opposite to each other in an axial direction of the piston rod, the piston rod having a rod internal space therein, the piston rod having a rod head provided at the first end of the piston rod;
a piston provided at the second end of the piston rod, the rod internal space being bounded at opposite ends thereof respectively by the rod head and the piston, the piston slidably moving inside the cylinder tube with the piston rod and dividing a space inside the cylinder tube into a piston-side chamber and a rod-side chamber;
a first communication passage communicating the rod-side chamber with the rod internal space;
a second communication passage formed in the piston and communicating the piston-side chamber with the rod internal space; and
a restrictor provided in the second communication passage to apply a resistance to a flow of a working fluid passing through the second communication passage, wherein
the rod internal space, bounded at the opposite ends respectively by the rod head and the piston, consists of a single continuous space within the piston rod,
a resistance applied to a flow of the working fluid passing through the first communication passage is smaller than the resistance applied by the restrictor to flow of the working fluid passing through the second communication passage and
the shock absorber is configured to generate a damping force by extending or contracting, and while the shock absorber is being extending and a pressure in the rod-side chamber and the rod internal space rises above a pressure in the piston-side chamber, the working fluid in the rod-side chamber and the rod internal space flows into the piston-side chamber through only the second communication passage.

8. The fluid pressure shock absorber according to claim 7, wherein
the first communication passage is formed in the piston rod.

9. The fluid pressure shock absorber according to claim 7, wherein
the damping force is generated by difference in pressure between the rod internal space and the rod-side chamber, and
a flow rate of the working fluid, which flows directly from the rod internal space to the rod-side chamber using the second communication passage during the extending, is configured to be greater than a flow rate of the working fluid, which flows directly to the rod internal space from the rod-side chamber using the second communication passage during the contracting, whereby the damping force generated during the extending is greater than the damping force generated during the contracting.

\* \* \* \* \*